United States Patent
Yonemaru et al.

(10) Patent No.: US 11,402,618 B2
(45) Date of Patent: Aug. 2, 2022

(54) MICROSCOPE OBJECTIVE

(71) Applicant: OLYMPUS CORPORATION, Hachioji (JP)

(72) Inventors: Yasuo Yonemaru, Tokyo (JP); Kenichiro Abe, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 622 days.

(21) Appl. No.: 16/283,793

(22) Filed: Feb. 24, 2019

(65) Prior Publication Data
US 2019/0324245 A1   Oct. 24, 2019

(30) Foreign Application Priority Data
Apr. 19, 2018   (JP) .............................. JP2018-080947

(51) Int. Cl.
*G02B 21/02*   (2006.01)
*G02B 13/00*   (2006.01)

(52) U.S. Cl.
CPC ........... *G02B 21/02* (2013.01); *G02B 13/006* (2013.01)

(58) Field of Classification Search
CPC .............................. G02B 21/02; G02B 13/006
See application file for complete search history.

(56) References Cited

U.S. PATENT DOCUMENTS

| | | | |
|---|---|---|---|
| 4,009,945 A * | 3/1977 | Klein | ..................... G02B 21/02 359/657 |
| 5,774,272 A | 6/1998 | Watanabe | |
| 2006/0056039 A1 | 3/2006 | Sakakura et al. | |
| 2016/0103308 A1* | 4/2016 | Furuya | ............... G02B 13/0095 359/368 |

(Continued)

FOREIGN PATENT DOCUMENTS

| JP | H11231224 A | 8/1999 |
|---|---|---|
| JP | 2001021812 A | 1/2001 |
| JP | 3525599 B2 | 5/2004 |

(Continued)

OTHER PUBLICATIONS

Extended European Search Report (EESR) dated Sep. 23, 2019 issued in European Patent Application No. 19159049.6.

(Continued)

*Primary Examiner* — Alicia M Harrington
(74) *Attorney, Agent, or Firm* — Holtz, Holtz & Volek PC

(57) ABSTRACT

A microscope objective includes: a first lens group that has a positive refractive power and includes a first cemented lens; and a second lens group, the first lens group and the second lens group having concave surfaces adjacent to and facing each other. The second lens group includes: at least one lens component that has a negative refractive power overall; a second cemented lens; and a single lens having a positive refractive power. An axial marginal light ray height is maximized at the lens surface of the microscope objective that is the closest to an image. The microscope objective satisfies the following conditional expression:

$$-0.38 \leq F_s/F_{C2} \leq 0.38 \qquad (1)$$

(Continued)

where $F_{C2}$ indicates the focal length of the second cemented lens for an e line, and $F_s$ indicates the focal length of the single lens for the e line.

19 Claims, 9 Drawing Sheets

(56) References Cited

U.S. PATENT DOCUMENTS

| | | |
|---|---|---|
| 2016/0139395 A1 | 5/2016 | Miyazono |
| 2017/0168281 A1 | 6/2017 | Furuya et al. |

FOREIGN PATENT DOCUMENTS

| | | |
|---|---|---|
| JP | 4121750 B2 | 7/2008 |
| JP | 2009294518 A | 12/2009 |
| JP | 2010224477 A | 10/2010 |
| JP | 4633405 B2 | 2/2011 |
| JP | 2012083486 A | 4/2012 |
| JP | 2016095408 A | 5/2016 |

OTHER PUBLICATIONS

Japanese Office Action (and English language translation thereof) dated Mar. 29, 2022, issued in counterpart Japanese Application No. 2018-080947.

* cited by examiner

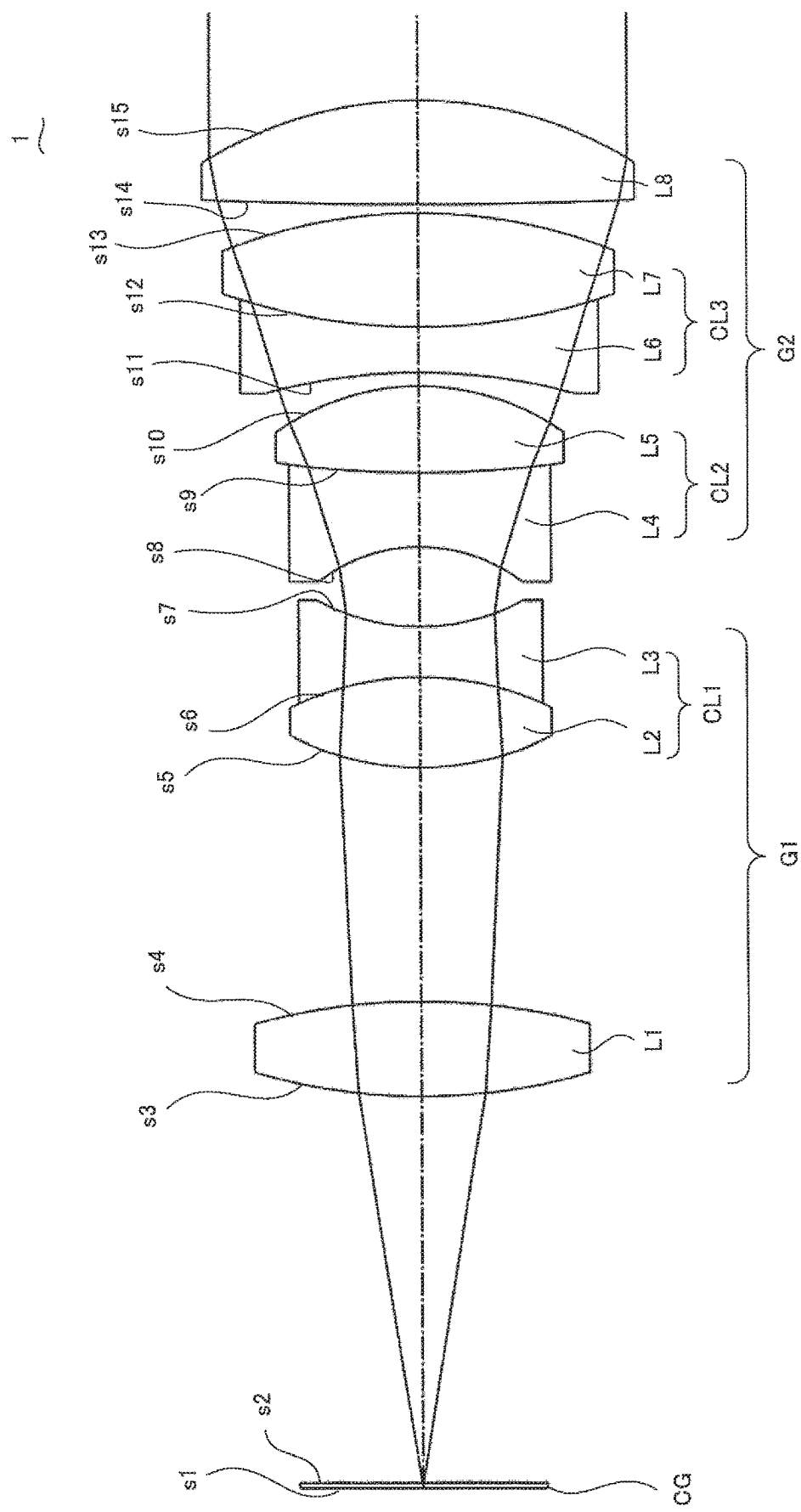
F I G. 2

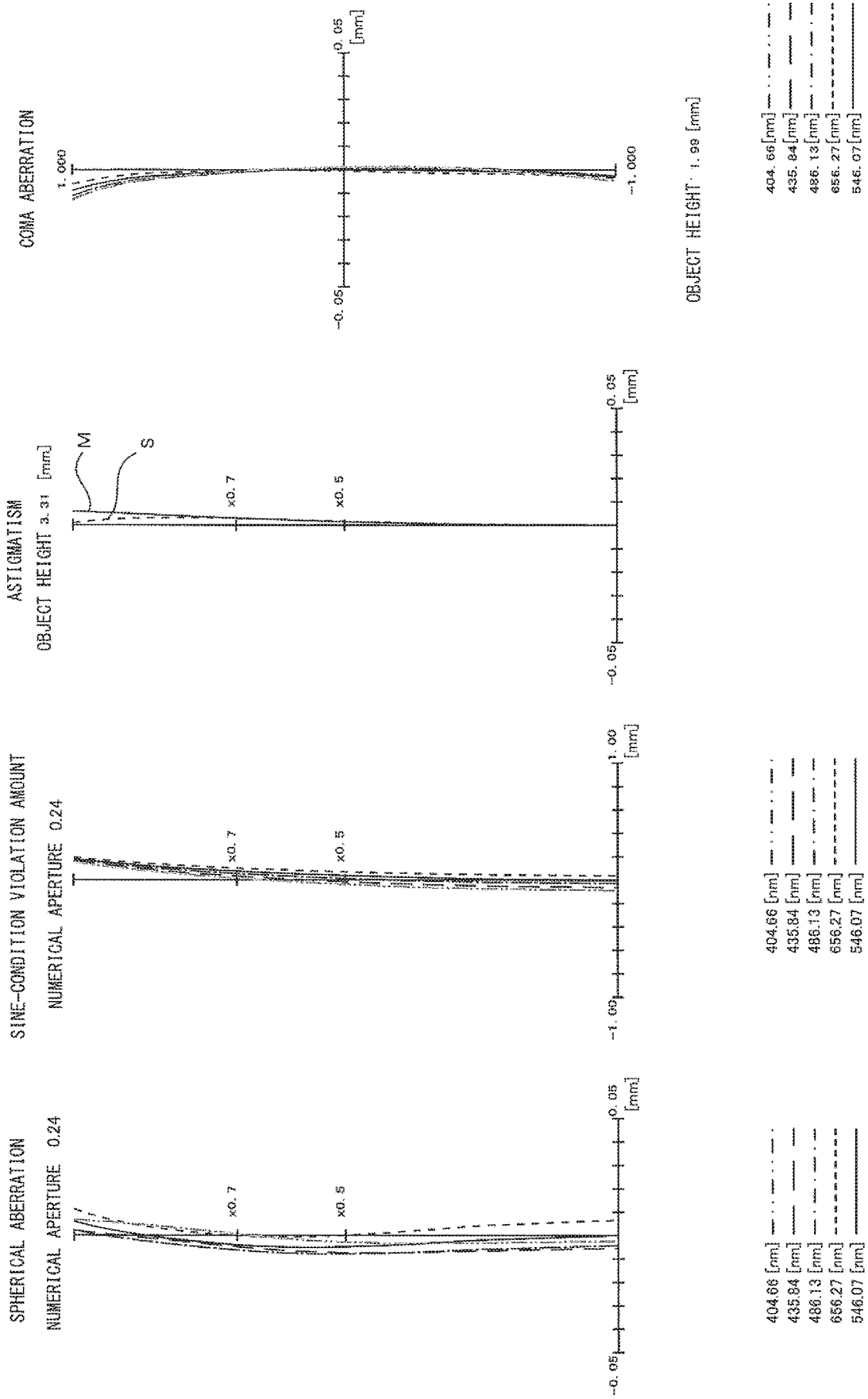

MICROSCOPE OBJECTIVE

CROSS REFERENCE TO RELATED APPLICATIONS

This application is based upon and claims the benefit of priority from prior Japanese Patent Application No. 2018-080947, filed Apr. 19, 2018, the entire contents of which are incorporated herein by this reference.

BACKGROUND OF THE INVENTION

Field of the Invention

The disclosure herein relates to a microscope objective.

Description of the Related Art

In recent years, there has been significant development in the pixel count for image sensors, and in the field of microscopes, microscope apparatuses have been increasingly expected to allow observation and image capturing to be performed with both a wide field of view and a high resolution. Such microscope apparatuses are required to include an objective that has a high numerical aperture (hereinafter referred to as NA) and that achieves a high aberration performance over a wide field of view. An objective used for a biological microscope will desirably accommodate a fluorescence observation based on excitation with a broadband ranging from a short wavelength of about 400 nm to a near-infrared wavelength. In addition, the objective will desirably be a dry objective in consideration of the usability in observations.

Low-magnification objectives that can ensure a wide field of view and accommodate a relatively wide wavelength band are described in, for example, Japanese Patent No. 4633405 and Japanese Laid-open Patent Publication No. 2010-224477.

SUMMARY OF THE INVENTION

A microscope objective in accordance with an aspect of the invention includes: a first lens group that has a positive refractive power and includes a first cemented lens; and a second lens group, the first lens group and the second lens group having concave surfaces adjacent to and facing each other, wherein an object, the first lens group, and the second lens group are arranged in this order. The second lens group includes: at least one lens component that has a negative refractive power overall; a second cemented lens; and a single lens that has a positive refractive power, wherein the object, the at least one lens component, the second cemented lens, and the single lens are arranged in this order. An axial marginal light ray height is maximized at the lens surface of the microscope objective that is the closest to an image. The microscope objective satisfies the following conditional expression:

$$-0.38 \leq F_s/F_{C2} \leq 0.38 \quad (1)$$

where $F_{C2}$ indicates the focal length of the second cemented lens for an e line, and $F_s$ indicates the focal length of the single lens for the e line.

A microscope objective in accordance with another aspect of the invention includes: two or more cemented lenses each including a positive lens and a negative lens, wherein an axial marginal light ray height is maximized at a lens surface of the microscope objective that is closest to an image. The two or more cemented lenses each satisfy the following conditional expression:

$$-0.016 \leq (\theta CtLp - \theta CtLn)/(vdLp - vdLn) < 0 \quad (2)$$

where $\theta CtLp$ indicates a partial dispersion ratio between a C line and a t line that is specific to the positive lens, $\theta CtLn$ indicates a partial dispersion ratio between the C line and the t line that is specific to the negative lens, $vdLp$ indicates an Abbe number of the positive lens, and $vdLn$ indicates an Abbe number of the negative lens.

A microscope objective in accordance with another aspect of the invention includes: a first lens group; and a second lens group, the first lens group and the second lens group having concave surfaces adjacent to and facing each other, wherein an object, the first lens group, and the second lens group are arranged in this order. The first lens group includes two or more lenses. An axial marginal light ray height is maximized at a lens surface of the microscope objective that is closest to an image. The microscope objective satisfies the following conditional expression:

$$0 < (Lgauss \times TL)/(Lmax2) \leq 2.4 \quad (5)$$

where Lgauss indicates a distance on an optical axis between a lens surface of the first lens group that is closest to the image in the first lens group and a lens surface of the second lens group that is closest to the object in the second lens group, TL indicates a distance on the optical axis between an object plane and a lens surface of the microscope objective that is closest to the image, and Lmax indicates a longest surface interval in the first lens group.

BRIEF DESCRIPTION OF THE DRAWINGS

The present invention will be more apparent from the following detailed description when the accompanying drawings are referenced.

FIG. 2 is a cross-sectional view of an objective 1 in accordance with a first embodiment of the invention;

FIGS. 3A-3D are each an aberration diagram for the objective 1 depicted in FIG. 2, wherein FIG. 3A is a spherical aberration diagram, FIG. 3B illustrates a sine-condition violation amount, FIG. 3C is an astigmatism diagram, and FIG. 3D is a coma aberration diagram for a position with an object height ratio of 0.6;

FIGS. 5A-5D are each an aberration diagram for the objective 2 depicted in FIG. 4, wherein FIG. 5A is a spherical aberration diagram, FIG. 5B illustrates a sine-condition violation amount, FIG. 5C is an astigmatism diagram, and FIG. 5D is a coma aberration diagram for a position with an object height ratio of 0.6;

FIGS. 7A-7D are each an aberration diagram for the objective 3 depicted in FIG. 6, wherein FIG. 7A is a spherical aberration diagram, FIG. 7B illustrates a sine-condition violation amount, FIG. 7C is an astigmatism diagram, and FIG. 7D is a coma aberration diagram for a position with an object height ratio of 0.6;

FIGS. 9A-9D are each an aberration diagram for the objective 4 depicted in FIG. 8, wherein FIG. 9A is a spherical aberration diagram, FIG. 9B illustrates a sine-condition violation amount, FIG. 9C is an astigmatism diagram, and FIG. 9D is a coma aberration diagram for a position with an object height ratio of 0.6.

DESCRIPTION OF THE EMBODIMENTS

Figure 1:
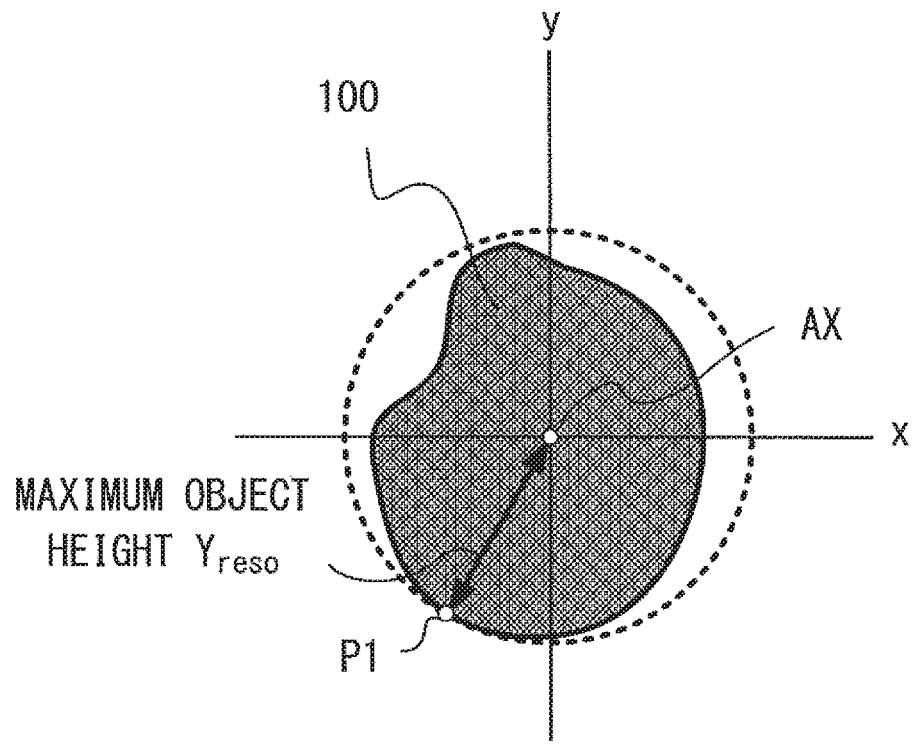
FIG. 1 illustrates a maximum object height $Y_{reso}$.

The objectives described in Japanese Patent No. 4633405 and Japanese Laid-open Patent Publication No. 2010-224477 are insufficient to correct axial chromatic aberrations and off-axis aberrations such as field curvatures and coma aberrations. Hence, it would be difficult for the objectives to achieve a high performance with a wide wavelength region for a wide field of view.

The following describes an objective in accordance with an embodiment of the present application in detail. The objective is an infinity-corrected microscope objective used in combination with a tube lens. The objective is what is called a dry objective and is used to observe a sample S with air between the sample S and objective. The objective is a low-magnification microscope objective that corrects chromatic aberrations in a preferable manner and has a high off-axis performance.

The objective includes: a first lens group which has a positive refractive power and on which a pencil of diverging light is incident from an object point; and a second lens group, wherein an object, the first lens group, and the second lens group are arranged in this order, and a concave surface of the first lens group and a concave surface of the second lens group is adjacent to each other and face each other.

The first lens group has a concave surface facing a concave surface of the second lens group. A border between the first and second lens groups may be identified in accordance with this feature. When there are a plurality of pairs of concave surfaces adjacent to and facing each other, a pair of concave surfaces among these pairs that provides, on the surfaces, a minimum axial marginal light ray height is defined as the border between the first and second lens groups.

The pencil of light herein refers to a pencil of light rays emitted from one point of an object (object point). Whether a single lens or a cemented lens, a lens component refers to one lens block that includes lens surfaces through which a light ray from an object point passes, wherein only a surface on an object side and a surface on an image side among these lens surfaces, i.e., only two of these lens surfaces, are in contact with air (or immersion liquid).

The first lens group desirably includes a first cemented lens. Thus, the first lens group desirably includes two or more lenses. The first cemented lens is, for example, a cemented doublet lens consisting of a positive lens and a negative lens.

The first lens group temporarily turns highly telecentric diverging light generated from an object plane into parallel light while changing the angle of an off-axis principal ray. Then, the first lens group turns the parallel light into diverging light while correcting an axial chromatic aberration by using the first cemented lens and causes the diverging light to be incident on the second lens group.

The lens component of the objective that is the closest to the object, i.e., the lens component of the first lens group that is the closest to the object in the first lens group, may be a cemented lens. This is because the first lens group having a cemented lens as the lens component that is the closest to the object allows a chromatic aberration of magnification and an axial chromatic aberration to be reduced.

The second lens group desirably includes: at least one lens component that has a negative refractive power overall; a second cemented lens; and a single lens group that has a positive refractive power, wherein the object, the at least one lens component, the second cemented lens, and the single lens group are arranged in this order. The second cemented lens is, for example, a cemented doublet lens consisting of a positive lens and a negative lens.

The second lens group turns diverging light incident from the first lens group into parallel light while correcting an axial chromatic aberration, an off-axis coma aberration, and an off-axis astigmatism, and then emits the parallel light. The at least one lens component that has a negative refractive power overall mainly serves to enlarge a numerical aperture by increasing a light ray height. The second cemented lens mainly serves to correct an axial chromatic aberration. The single lens mainly serves to turn diverging light into parallel light.

The objective includes, as described above, at least two cemented lenses each including a positive lens and a negative lens so that a large axial chromatic aberration that cannot be corrected by a single cemented lens can be corrected. Meanwhile, in this objective, the axial marginal light ray height is maximized at the lens surface of the objective that is the closest to the image, i.e., the lens surface of the single lens on the image side. Hence, a refractive angle of a light ray that could be formed within the objective can be limited. Accordingly, the objective can reduce the axial chromatic aberration and prevent the off-axis performance from being significantly decreased in comparison with the axial performance.

The objective desirably satisfies conditional expression (1).

$$-0.38 \leq F_s/F_{C2} \leq 0.38 \tag{1}$$

In conditional expression (1), $F_{C2}$ indicates the focal length of the second cemented lens for an e line, and $F_s$ indicates, for the e line, the focal length of a single lens included in the second lens group. This single lens is located on the image side of the second cemented lens.

When $F_s/F_{C2}$ is not lower than a lower limit, an axial chromatic aberration can be corrected in a preferable manner, and an off-axis coma aberration and an off-axis astigmatism can be corrected in a preferable manner. More particularly, by the second cemented lens having a low negative refractive power, an axial chromatic aberration that could be generated by another lens can be corrected. By the single lens having a high refractive power, the angle of an off-axis light ray can be gradually changed within the objective so as to correct an off-axis coma aberration and an off-axis astigmatism in a preferable manner. When $F_s/F_{C2}$ is not higher than an upper limit, an axial chromatic aberration that has been excessively corrected by another lens can be corrected in the reverse direction using the low positive refractive power of the second cemented lens. Hence, satisfying conditional expression (1) allows an axial chromatic aberration and an off-axis aberration to be corrected in a preferable manner.

The objective may satisfy conditional expression (1-1) instead of conditional expression (1). Satisfying conditional expression (1-1) allows an axial chromatic aberration and an off-axis aberration to be corrected in a more preferable manner.

$$-0.32 \leq F_s/F_{C2} \leq 0.32 \tag{1-1}$$

The first and second cemented lenses of the objective each desirably satisfy conditional expression (2).

$$-0.016 \leq (\theta_{Cd}L_p - \theta_{Cd}L_n)/(\nu dL_p - \nu dL_n) < 0 \tag{2}$$

In conditional expression (2), $\theta_{Ct}L_p$ indicates a partial dispersion ratio between a C line and a t line that is specific to the positive lens included in the cemented lens; $\theta_{Ct}L_n$, a partial dispersion ratio between the C line and the t line that is specific to the negative lens included in the cemented lens; $vdL_p$, the Abbe number of the positive lens included in the cemented lens; and $vdL_n$, the Abbe number of the negative lens included in the cemented lens. Partial dispersion ratios $\theta_{Ct}L_p$ and $\theta_{Ct}L_n$ are calculated in accordance with $(n_c-n_t)/(n_F-n_c)$, where $n_c$ indicates a refractive index for the C line; $n_t$, a refractive index for the t line; $n_F$, a refractive index for an F line.

When the cemented lens is used for the purpose of correcting a chromatic aberration only in a visible region, $(\theta_{Ct}L_p-\theta_{Ct}L_n)/(vdL_p-vdL_n)$ is typically a positive value. $(\theta_{Ct}L_p-\theta_{Ct}L_n)/(vdL_p-\theta dL_n)$ may be adjusted to a negative value to correct an axial chromatic aberration of a near-infrared region that could be caused by another lens. In addition, when $(\theta_{Ct}L_p-\theta_{Ct}L_n)/(vdL_p-vdL_n)$ is not lower than a lower limit, a chromatic aberration of a near-infrared region can be prevented from being excessively corrected. Accordingly, chromatic aberrations are reduced for a range from a short wavelength of about 400 nm to a visible region. As a result, axial chromatic aberrations can be corrected for a range from a short wavelength of about 400 nm to a near-infrared wavelength. Hence, satisfying conditional expression (2) allows an axial chromatic aberration to be corrected in a preferable manner.

It is more desirable that the objective satisfy conditional expression (2-1) instead of conditional expression (2).

$$-0.001 \leq (\theta_{Ct}L_p-\theta_{Ct}L_n)/(vdL_p-vdL_n)<0 \quad (2\text{-}1)$$

At least one of the first and second cemented lenses of the objective desirably satisfies conditional expression (3).

$$-0.001 \leq (\theta_{hg}L_p-\theta_{hg}L_n)/(vdL_p-vdL_n)<0 \quad (3)$$

In conditional expression (3), $\theta_{hg}L_p$ indicates a partial dispersion ratio between an h line and a g line that is specific to the positive lens included in the cemented lens; $\theta_{hg}L_n$, a partial dispersion ratio between the h line and the g line that is specific to the negative lens included in the cemented lens. Partial dispersion ratios $\theta_{hg}L_p$ and $\theta_{hg}L_n$ are calculated in accordance with $(n_h-n_g)/(n_F-n_c)$, where $n_h$ indicates a refractive index for the h line; $n_g$, a refractive index for the g line; $n_F$, a refractive index for the F line; $n_c$, a refractive index for the C line.

$(\theta_{hg}L_p-\theta_{hg}L_n)/(vdL_p-vdL_n)$ may be adjusted to a negative value to correct an axial chromatic aberration of a short wavelength of about 400 nm that could be caused by another lens. In addition, when $(\theta_{hg}L_p-\theta_{hg}L_n)/(vdL_p-vdL_n)$ is not lower than a lower limit, a chromatic aberration of a short wavelength of about 400 nm can be prevented from being excessively corrected. Accordingly, chromatic aberrations are reduced for a range from a visible region to a near-infrared region. As a result, axial chromatic aberrations can be corrected in a more preferable manner for a range from a short wavelength of about 400 nm to a near-infrared wavelength. Hence, satisfying conditional expression (3) allows an axial chromatic aberration to be corrected in a more preferable manner.

It is more desirable that the objective satisfy conditional expression (3-1) instead of conditional expression (3).

$$-0.0004 \leq (\theta_{hg}L_p-\theta_{hg}L_n)/(vdL_p-vdL_n)<0 \quad (3\text{-}1)$$

The objective also desirably satisfies conditional expression (4). In particular, the objective desirably satisfies conditional expressions (4-1) and (4-2).

$$-1.25 \leq TL/F_C \leq 1.25 \quad (4)$$

$$-1.25 \leq TL/F_{C1} \leq 1.25 \quad (4\text{-}1)$$

$$-1.25 \leq TL/F_{C2} \leq 1.25 \quad (4\text{-}2)$$

In these conditional expressions, TL indicates a distance on an optical axis between the object plane and the lens surface of the objective that is the closest to the image; $F_C$, the focal length of the two or more cemented lenses for the e line; $F_{C1}$, the focal length of the first cemented lens for the e line.

When $TL/F_C$ in conditional expression (4) is not lower than a lower limit, an axial chromatic aberration can be corrected in a preferable manner. This is because, by the cemented lens having a low negative refractive power, an axial chromatic aberration that could be generated by another lens can be corrected. When $TL/F_C$ is not higher than an upper limit, an axial chromatic aberration that has been excessively corrected by another lens can be corrected in the reverse direction using the cemented lens having a low positive refractive power. These are also applicable to conditional expressions (4-1) and (4-2). Hence, satisfying conditional expression (4), (4-1), or (4-2) allows an axial chromatic aberration to be corrected in a preferable manner.

The objective also desirably satisfies conditional expression (5).

$$0<(L_{gauss} \times TL)/L_{max}^2) \leq 2.4 \quad (5)$$

In this conditional expression, $L_{gauss}$ indicates a distance on an optical axis between the lens surface of the first lens group that is the closest to the image in the first lens group and the lens surface of the second lens group that is the closest to the object in the second lens group, and $L_{max}$ indicates a longest surface interval in the first lens group.

When $(L_{gauss} \times TL)(L_{max}^2)$ is not higher than an upper limit, a surface interval is long in a region through which diverging light passes, and the angle of an off-axis light ray is gradually changed. A lens thickness and an air interval are always positive values. Hence, the surface interval is also a positive value, and the lower limit of $(L_{gauss} \times TL)/(L_{max}^2)$ is higher than 0. Satisfying conditional expression (5) allows an off-axis coma aberration and an off-axis astigmatism to be reduced in a preferable manner.

The objective desirably satisfies conditional expression (5-1) instead of conditional expression (5). In particular, setting $(L_{gauss} \times TL)/(L_{max}^2)$ to a value that is equal to or higher than the lower limit of conditional expression (5-1) allows both the off-axis aberrations and a chromatic aberration to be reduced. Setting $L_{gauss} \times TL/L_{max}^2)$ to a value that is equal to or lower than the upper limit allows the off-axis coma aberration and the off-axis astigmatism to be reduced in a more preferable manner.

$$0.8 \leq (L_{gauss} \times TL)/(L_{max}^2) \leq 2.1 \quad (5\text{-}1)$$

In addition, the objective may satisfy conditional expression (6).

$$0 \leq |\Delta z_1|/DOF_e \leq 2 \quad (6)$$

In this conditional expression, $\Delta z_1$ indicates a difference between an axial position at which an RMS wave aberration in the h line is minimized (hereinafter referred to as an h-line minimization position) and an axial position at which an RMS wave aberration in the e line (546.07 nm) is minimized (hereinafter referred to as an e-line minimization position), and $DOF_e$ indicates a depth of focus for the e line.

An axial position refers to an axial position within a region between the objective and the object. An expression for calculating the depth of focus $DOF_e$ is $DOF_e=\lambda_e/(2\times NA_{ob}^2)$, where $\lambda_e$ indicates the wavelength of the e line, and $NA_{ob}$ indicates the numerical aperture of the objective.

Conditional expression (6) is intended mainly to correct an axial chromatic aberration in a preferable manner. Biological microscope optical systems are often used to perform fluorescence observations using excitation light having a short wavelength close to the h line. Hence, axial chromatic aberration properties to the h line and the e line are important. When $|\Delta z_1|/DOF_e$ is higher than an upper limit, an excessively large axial chromatic aberration is caused by the objective. Hence, without significantly compensating for the axial chromatic aberration by using a tube lens, a large axial chromatic aberration would occur on an image plane. However, it is difficult in practice to compensate for a large axial chromatic aberration by using a tube lens. Compensating for an aberration by using a tube lens means providing the tube lens with an aberration. Hence, considering that the objective lens combined with the tube lens is switched between a plurality of objectives each having a different aberration property, it is not preferable to compensate for an axial chromatic aberration by using the tube lens. Satisfying conditional expression (6) allows the objective alone to correct an axial chromatic aberration in a preferable manner. In particular, an axial chromatic aberration can be corrected in a preferable manner even when light having a short wavelength such as the h line is used as excitation light.

The objective may satisfy conditional expression (6-1) instead of conditional expression (6).

$$0 \leq |z_1|/DOF_e \leq 1 \quad (6\text{-}1)$$

When the difference between the positions described above is equal to or less than the depth of focus multiplied by 1 as indicated by conditional expression (6-1), the objective is particularly effective for use in a microscope apparatus that has a high resolution in an optical axis direction. For example, misalignment of a sample caused by a chromatic aberration may be reduced in multicolor imaging in which images are obtained by a confocal microscope apparatus using a plurality of excitation wavelengths and overlaid on each other.

The objective may satisfy conditional expression (7).

$$10 \text{ mm} \leq Y_{reso} \times |\beta| \leq FN \text{ mm} \quad (7)$$

In this conditional expression, $Y_{reso}$ indicates a maximum object height within a region on a plane orthogonal to an optical axis that crosses an axial position at which an RMS wave aberration in the e line is minimized (e-line minimization position), wherein the region is such that the RMS wave aberration in the e line divided by the wavelength of the e line is 0.2 or lower. $\beta$ indicates the magnification of the objective. FN indicates a maximum image height of the objective and is ½ of a field of view number.

The magnification $\beta$ of the objective indicates a magnification achieved when the objective is combined with a tube lens that has focal lengths determined individually for various objectives in advance. Magnification $\beta$ is calculated in accordance with "focal length of tube lens/focal length of objective". A focal length of the tube lens determined in advance is, for example, 180 mm. The maximum image height of the objective is calculated in accordance with "object height"×"magnification".

As depicted in FIG. 1, maximum object height $Y_{reso}$ is a maximum object height of a region 100 that satisfies a predetermined condition. Note that FIG. 1 depicts a cross section orthogonal to an optical axis of an objective that crosses an e-line minimization position (hereinafter referred to as an e-line minimization cross section). Maximum object height $Y_{reso}$ is determined as follows: First, (RMS wave aberration in the e line)/$\lambda_e$ is calculated for each point on the e-line minimization cross section. Second, a region 100 on the e-line minimization cross section that satisfies (RMS wave aberration in the e line)/$\lambda_e \leq 0.2$ is identified. Third, a point within the region 100 that is the most distant from an optical axis AX is identified as a point P1. Finally, the distance between the point P1 and the optical axis AX is calculated as maximum object height $Y_{reso}$.

When the objective has rotational symmetry, the region 100 also has rotational symmetry (i.e., a circular shape). Accordingly, the region 100 has a constant object height irrespective of orientation, and maximum object height $Y_{reso}$ is this constant object height. Meanwhile, when the objective has a manufacturing error, the region 100 has rotational asymmetry. As a result, the region 100 has an object height that depends on an orientation, as depicted in, for example, FIG. 1. In this case, maximum object height $Y_{reso}$ is an object height in an orientation in which the distance from the optical axis to a border of the region 100 is maximized.

Conditional expression (7) is a conditional expression for obtaining a preferable edge-portion resolution in an observation using the objective. An edge-portion resolution refers to a resolution for an edge portion of a field of view and tends to be degraded when a large off-axis aberration occurs. When $Y_{reso} \times |\beta|$ is lower than a lower limit, an excessively large off-axis aberration is caused by the objective, and the aberration needs to be significantly compensated for using a tube lens. However, it is difficult in practice to compensate for a large off-axis aberration by using a tube lens. Meanwhile, compensating for an aberration by using a tube lens means providing the tube lens with an aberration. This is unfavorable for the reason described above with reference to conditional expression (6). When $Y_{reso} \times |\beta|$ is higher than an upper limit, a wide region with a preferable off-axis aberration is achieved in a primary image-forming position. However, it would not be preferable to obtain an image for this range because image sensors and units for holding the same would be large-sized. Satisfying conditional expression (7) allows a preferable edge-portion resolution to be achieved.

Specific examples of the objective described above are described in the following.

First Embodiment

FIG. 2 is a cross-sectional view of an objective 1 in accordance with the present embodiment. The objective 1 is a dry microscope objective that includes a first lens group G1 having a positive refractive power and a second lens group G2 having a positive refractive power, the second lens group G2 being closer to an image than the first lens group G1 is. The first lens group G1 and the second lens group G2 have concave surfaces adjacent to and facing each other. An axial marginal light ray height is maximized at the lens surface of the objective 1 that is the closest to the image.

The first lens group G1 includes a biconvex lens L1 and a cemented lens CL1, wherein an object, the biconvex lens L1, and the cemented lens CL1 are arranged in this order. The cemented lens CL1, which is a first cemented lens of the objective 1, is a cemented doublet lens consisting of a biconvex lens L2 and a biconcave lens L3.

The second lens group G2 includes a cemented lens CL2, a cemented lens CL3, and a biconvex lens L8, wherein the object, the cemented lens CL2, the cemented lens CL3, and the biconvex lens L8 are arranged in this order. The cemented lens CL2 is a cemented doublet lens consisting of a biconcave lens L4 and a biconvex lens L5. The cemented lens CL3, which is a second cemented lens of the objective 1, is a cemented doublet lens consisting of a biconcave lens L6 and a biconvex lens L7.

Various data of the objective 1 are indicated below. F indicates the focal length of the objective 1 for an e line, and $F_{G1}$ and $F_{G2}$ respectively indicate the focal length of the first lens group G1 for the e line and the focal length of the second lens group G2 for the e line. $|\beta|$ indicates a magnification achieved when the objective 1 is combined with a tube lens having a focal length of 180 mm. FN indicates a maximum image height achieved when the objective 1 is combined with a tube lens having a focal length of 180 mm. WD indicates a working distance of the objective 1.

F=45 mm, $F_{G1}$=21.64 mm, $F_{G2}$=56.53 mm, $NA_{ob}$=0.16, $|\beta|$=4, FN=13.25, WD=13.2458 mm, $F_{C1}$=−43.11 mm, $F_{C2}$=−4506.28 mm, $F_s$=26.35 mm, TL=47.5785 mm, $L_{gauss}$≤2.7456 mm, $L_{max}$=8.0214 mm, $|\Delta z_1|$=3.22 µm, $DOF_e$=10.66 µm, $Y_{reso}$=3 0.3125 mm The following are various data of the first cemented lens.

$\theta_{Ct}L_p$=0.84233, $\theta_{Ct}L_n$=0.86725, $\theta_{hg}L_p$=0.43844, $\theta_{hg}L_n$=0.44169, $vdL_p$=94.66, $vdL_n$=64.14

The following are various data of the second cemented lens.

$\theta_{Ct}L_p$=0.84233, $\theta_{Ct}L_n$=0.89065, $\theta_{hg}L_p$=0.43844, $\theta_{hg}L_n$=0.43453, $vdL_p$=94.66, $vdL_n$=70.23

The following are lens data of the objective 1. INF in the lens data indicates infinity (∞).

| Objective 1 | | | | | |
|---|---|---|---|---|---|
| s | r | d | ne | nh | vd |
| 1 | INF | 0.17 | 1.52626 | 1.54042 | 54.41 |
| 2 | INF | 13.2458 | | | |
| 3 | 20.4097 | 3.2684 | 1.51825 | 1.52977 | 64.14 |
| 4 | −22.1977 | 8.0214 | | | |
| 5 | 9.8755 | 3.0895 | 1.43986 | 1.44647 | 94.66 |
| 6 | −10.1728 | 1.7328 | 1.51825 | 1.52977 | 64.14 |
| 7 | 7.3477 | 2.7456 | | | |
| 8 | −5.7177 | 2.5231 | 1.75844 | 1.77954 | 52.32 |
| 9 | 36.266 | 2.9771 | 1.43986 | 1.44647 | 94.66 |
| 10 | −8.5226 | 0.4709 | | | |
| 11 | −20.1257 | 1.5608 | 1.48915 | 1.49898 | 70.23 |
| 12 | 20.4365 | 3.8973 | 1.43986 | 1.44647 | 94.66 |
| 13 | −18.1858 | 0.3014 | | | |
| 14 | 185.9612 | 3.5703 | 1.49846 | 1.5072 | 81.54 |
| 15 | −14.0427 | | | | | s indicates a surface number; r, a radius of curvature (mm); d, a surface interval (mm); ne, a refractive index for the e line; nh, a refractive index for the h line; vd, an Abbe number. These marks are also applicable to the embodiments described hereinafter. Surface numbers s1 and s2 respectively indicate an object plane (surface of cover glass CG on an object side) and a surface of the cover glass CG on an image side. Surface numbers s3 and s15 respectively indicate a lens surface of the objective 1 that is the closest to an object and a lens surface of the objective 1 that is the closest to an image. For example, surface interval dl indicates a distance on an optical axis from the surface indicated by surface number s1 to the surface indicated by surface number s2.

As indicated in the following, the objective 1 satisfies conditional expressions (1)-(7). Note that conditional expression (3) is satisfied by the first cemented lens.

$$F_s/F_{C2}=-0.0058 \qquad (1)$$

First Cemented Lens $$(\theta_{Ct}L_p-\theta_{Ct}L_n)/(vdL_p-vdL_n)=-0.00082$$

Second Cemented Lens $$(\theta_{Ct}L_p-\theta_{Ct}L_n)/(vdL_p-vdL_n)=-0.00198 \qquad (2)$$

First Cemented Lens $$(\theta_{hg}L_p-\theta_{hg}L_n)/(vdL_p-vdL_n)=-0.00011$$

Second Cemented Lens $$(\theta_{hg}L_p-\theta_{hg}L_n)/(vdL_p-vdL_n)=0.00016 \qquad (3)$$

$$TL/F_{C1}=-1.103 \qquad (4\text{-}1)$$

$$TL/F_{C2}=-0.011 \qquad (4\text{-}2)$$

$$(L_{gauss}\times TL)/(L_{max}^2)=2.030 \qquad (5)$$

$$|\Delta z_1|/DOF_e=0.302 \qquad (6)$$

$$Y_{reso}\times|\beta|=13.25 \text{ mm} \qquad (7)$$

Figure 3:
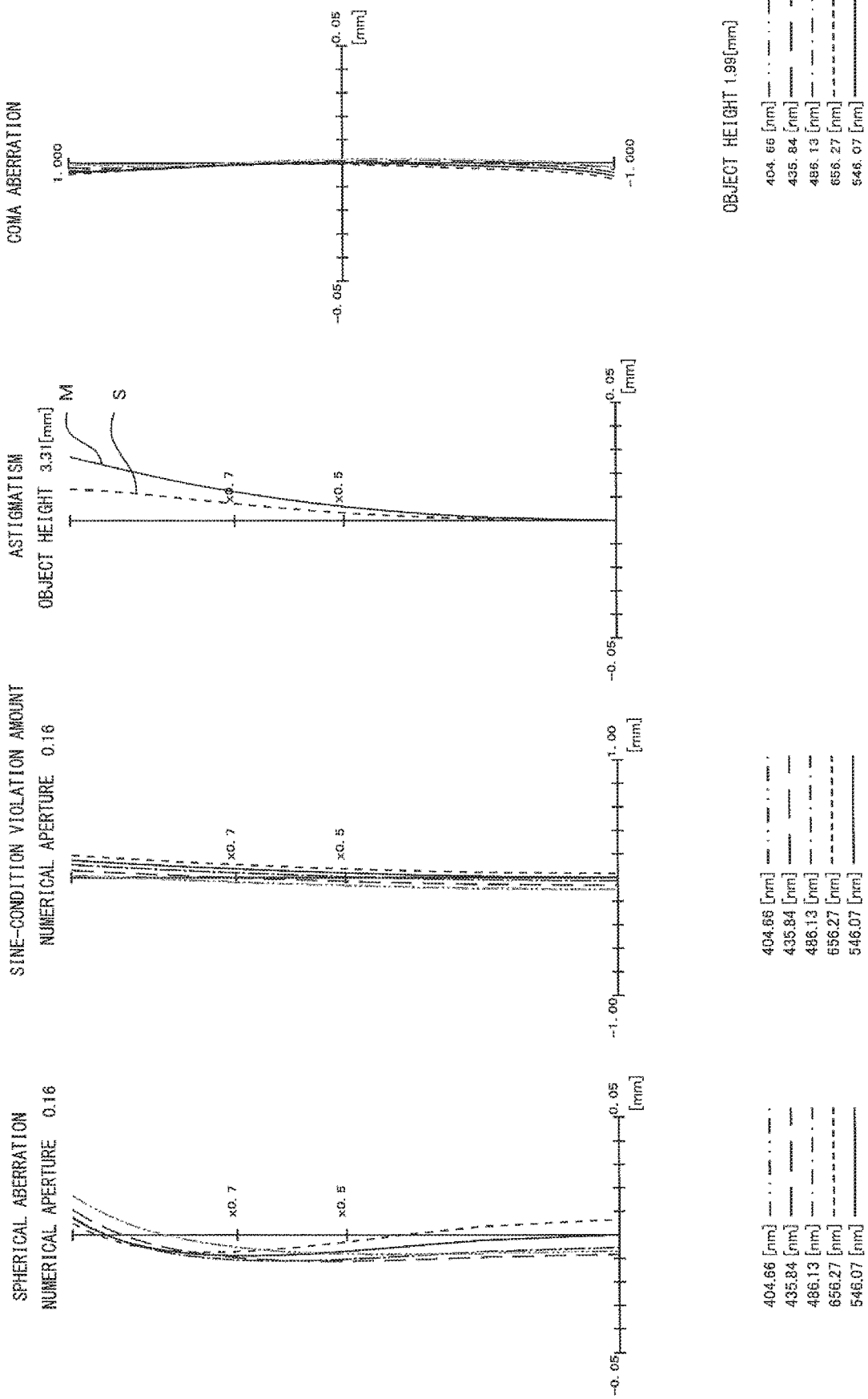

FIGS. 3A-3D are each an aberration diagram for the objective 1 depicted in FIG. 2. FIGS. 3A-3D indicate aberrations that occur on an o when an infinitely distant light flux is incident from an image side. FIG. 3A is a spherical aberration diagram. FIG. 3B illustrates a sine-condition violation amount. FIG. 3C is an astigmatism diagram. FIG. 3D is a coma aberration diagram for a position with an object height ratio of 0.6 (object height 1.99 mm). "M" in the figures indicates a meridional component, and "S" indicates a sagittal component. In the present embodiment, as depicted in FIGS. 3A-3D, aberrations are corrected for a wide field of view in a preferable manner.

Second Embodiment

Figure 4:
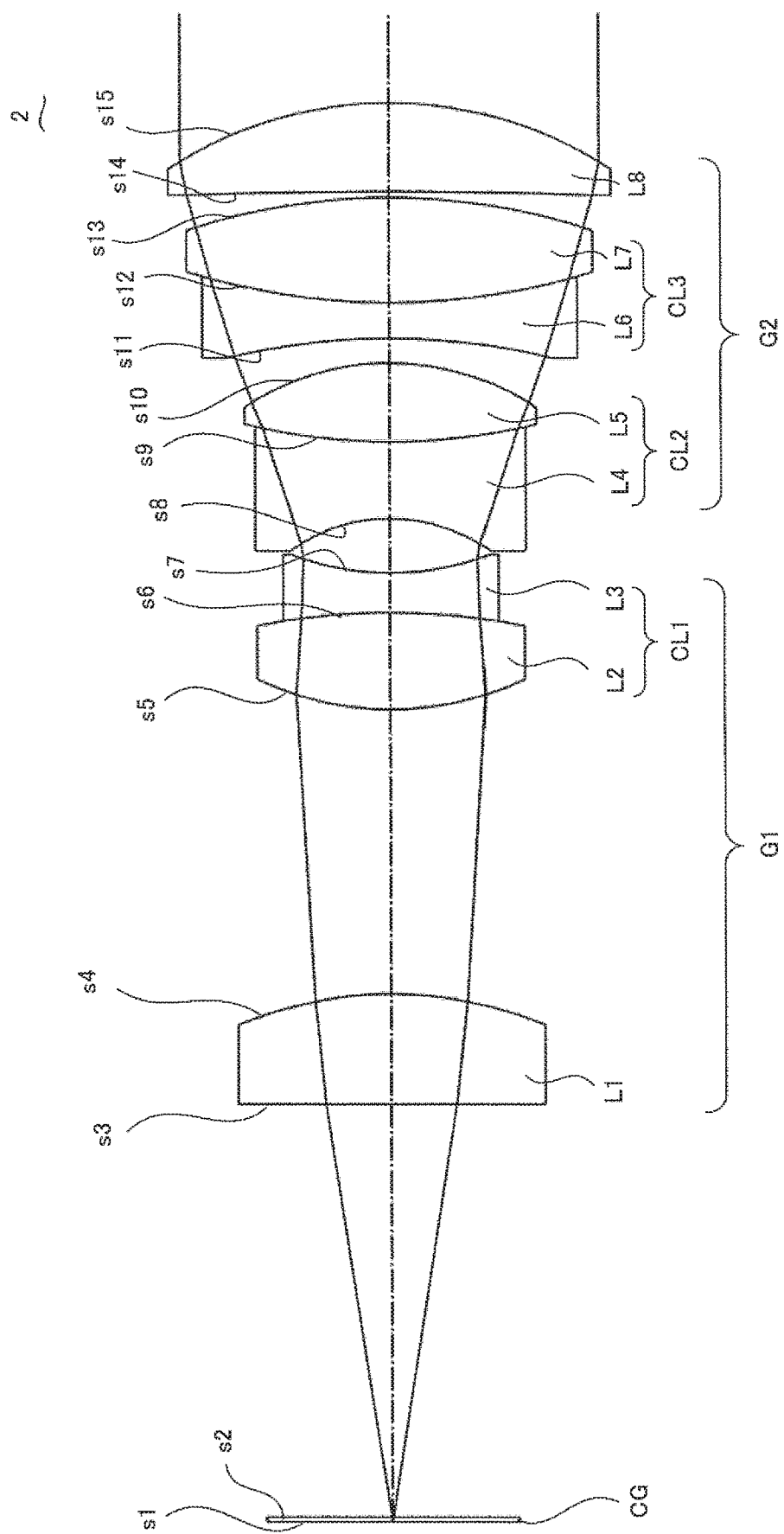
FIG. 4 is a cross-sectional view of an objective 2 in accordance with a second embodiment of the invention.

FIG. 4 is a cross-sectional view of an objective 2 in accordance with the present embodiment. The objective 2 is a dry microscope objective that includes a first lens group G1 having a positive refractive power and a second lens group G2 having a positive refractive power, the second lens group G2 being closer to an image than the first lens group G1 is. The first lens group G1 and the second lens group G2 have concave surfaces adjacent to and facing each other. An axial marginal light ray height is maximized at the lens surface of the objective 2 that is the closest to the image.

The first lens group G1 includes a planoconvex lens L1 having a flat plane facing an object and a cemented lens CL1, wherein the object, the planoconvex lens L1, and the cemented lens CL1 are arranged in this order. The cemented lens CL1, which is a first cemented lens of the objective 2, is a cemented doublet lens consisting of a biconvex lens L2 and a biconcave lens L3.

The second lens group G2 includes a cemented lens CL2, a cemented lens CL3, and a meniscus lens L8 having a concave surface facing the object, wherein the object, the cemented lens CL2, the cemented lens CL3, and the meniscus lens L8 are arranged in this order. The cemented lens CL2 is a cemented doublet lens consisting of a biconcave lens L4 and a biconvex lens L5. The cemented lens CL3, which is a second cemented lens of the objective 2, is a cemented doublet lens consisting of a biconcave lens L6 and a biconvex lens L7.

The following are various data of the objective 2.

F=45 mm, $F_{G1}$=32.67 mm, $F_{G2}$=46.24 mm, $NA_{ob}$=0.16, $|\beta|$=4, FN=13.25, WD=13.8354 mm, $F_{C1}$=−40.59 mm, $F_{C2}$=138.31 mm, $F_s$=29.29 mm, TL=47.5753 mm, $L_{gauss}$=1.8251 mm, $L_{max}$=9.5453 mm, $|\Delta z_1|$=16.69 μm, $DOF_e$=10.66 μm, $Y_{reso}$=3.3125 mm The following are various data of the first cemented lens.

$\theta_{Ct}L_p$=0.82759, $\theta_{Ct}L_n$=0.83267, $\theta_{hg}L_p$=0.44171, $\theta_{hg}L_n$=0.45179, $vdL_p$=81.54, $vdL_n$=55.53

The following are various data of the second cemented lens.

$\theta_{Ct}L_p$=0.81944, $\theta_{Ct}L_n$=0.89065, $\theta_{hg}L_p$=0.44583, $\theta_{hg}L_n$=0.43453, $vdL_p$=74.7, $vdL_n$=70.23

The following are lens data of the objective 2.

| Objective 2 | | | | | |
|---|---|---|---|---|---|
| s | r | d | ne | nh | vd |
| 1 | INF | 0.17 | 1.52626 | 1.54042 | 54.41 |
| 2 | INF | 13.8354 | | | |
| 3 | INF | 3.6835 | 1.50738 | 1.51966 | 59.67 |
| 4 | −13.5456 | 9.5453 | | | |
| 5 | 10.4868 | 3.2518 | 1.49846 | 1.5072 | 81.54 |
| 6 | −23.1155 | 1.3352 | 1.69979 | 1.71801 | 55.53 |
| 7 | 9.4125 | 1.8251 | | | |
| 8 | −5.7921 | 2.5618 | 1.65141 | 1.66954 | 53.02 |
| 9 | 20.7121 | 2.643 | 1.43985 | 1.44645 | 94.93 |
| 10 | −8.8717 | 0.8301 | | | |
| 11 | −23.0739 | 1.2008 | 1.48915 | 1.49898 | 70.23 |
| 12 | 23.1614 | 3.5088 | 1.53947 | 1.54984 | 74.7 |
| 13 | −21.792 | 0.2014 | | | |
| 14 | −200.8748 | 2.9823 | 1.49846 | 1.5072 | 81.54 |
| 15 | −13.6097 | | | | |

As indicated in the following, the objective 2 satisfies conditional expressions (1)-(7). Note that conditional expression (3) is satisfied by the first cemented lens.

$$F_s/F_{C2}=0.212 \quad (1)$$

First Cemented Lens $$(\theta_{Ct}L_p-\theta_{Ct}L_n)/(vdL_p-vdL_n)=-0.00020$$

Second Cemented Lens $$(\theta_{Ct}L_p-\theta_{Ct}L_n)/(vdL_p-vdL_n)=-0.01593 \quad (2)$$

First Cemented Lens $$(\theta_{hg}L_p-\theta_{hg}L_n)/(vdL_p-vdL_n)=-0.00039$$

Second Cemented Lens $$(\theta_{hg}L_p-\theta_{hg}L_n)/(vdL_p-vdL_n)=0.00253 \quad (3)$$

$$TL/F_{C1}=-1.17 \quad (4\text{-}1)$$

$$TL/F_{C2}=0.34 \quad (4\text{-}2)$$

$$(L_{gauss} \times TL)/(L_{max}^2)=0.95 \quad (5)$$

$$|\Delta z_1|/DOF_e=1.566 \quad (6)$$

$$Y_{reso}|\beta|=13.25 \text{ mm} \quad (7)$$

Figure 5:
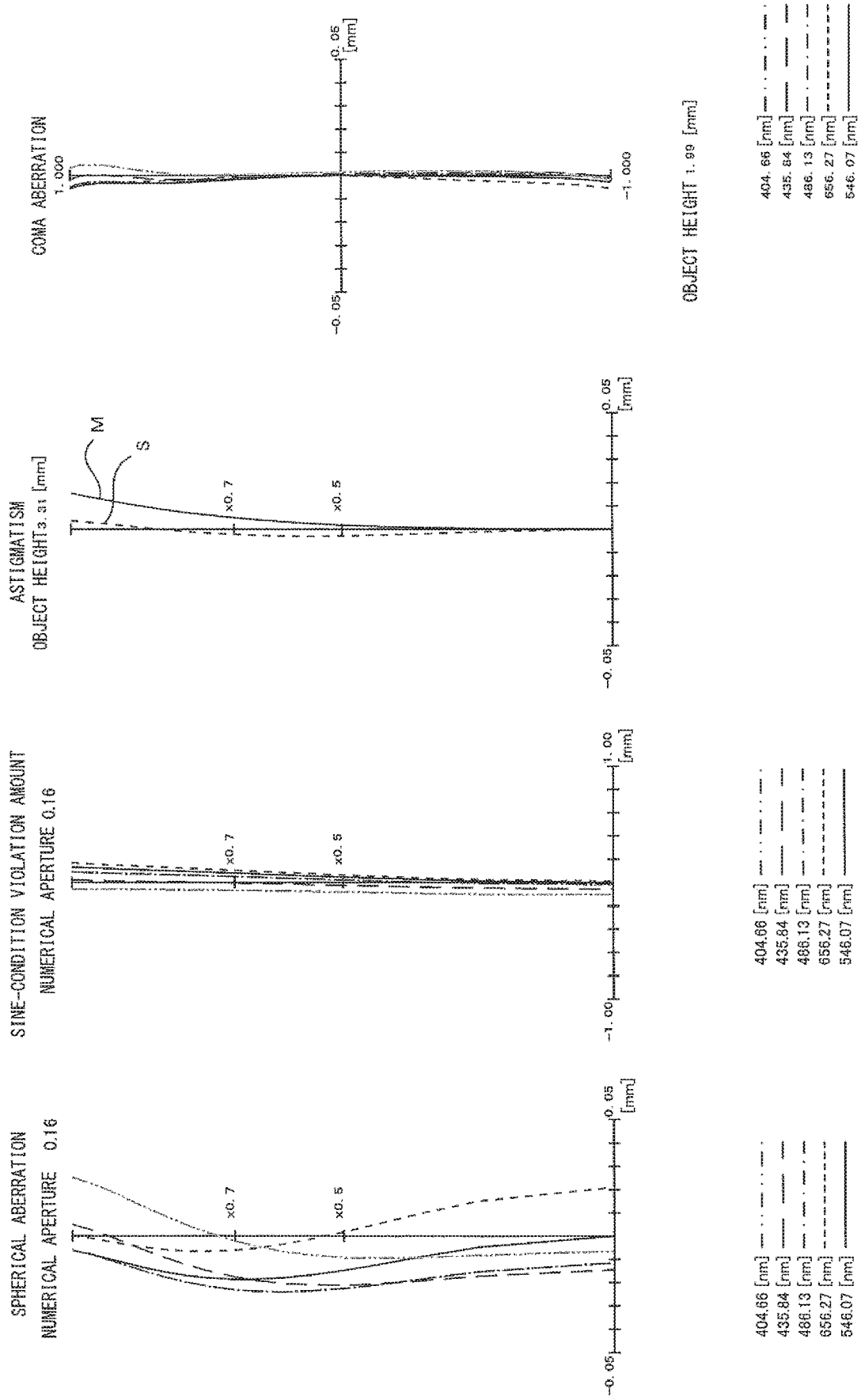

FIGS. 5A-5D are each an aberration diagram for the objective 2 depicted in FIG. 4. FIGS. 5A-5D indicate aberrations that occur on an object plane when an infinitely distant light flux is incident from an image side. FIG. 5A is a spherical aberration diagram. FIG. 5B illustrates a sine-condition violation amount. FIG. 5C is an astigmatism diagram. FIG. 5D is a coma aberration diagram for a position with an object height ratio of 0.6 (object height 1.99 mm). In the present embodiment, as depicted in FIGS. 5A-5D, aberrations are corrected for a wide field of view in a preferable manner.

Third Embodiment

Figure 6:
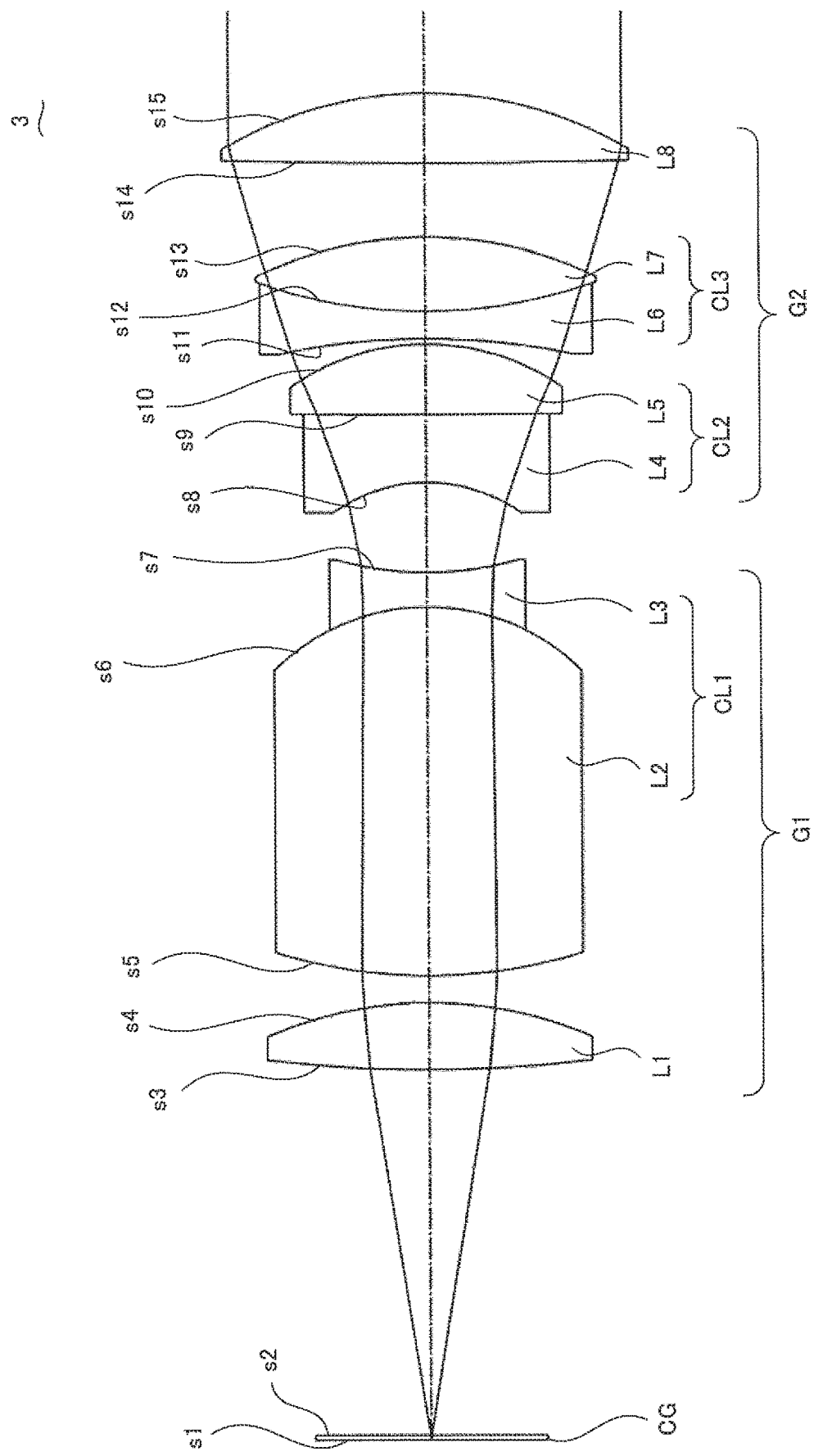
FIG. 6 is a cross-sectional view of an objective 3 in accordance with a third embodiment of the invention.

FIG. 6 is a cross-sectional view of an objective 3 in accordance with the present embodiment. The objective 3 is a dry microscope objective that includes a first lens group G1 having a positive refractive power and a second lens group G2 having a positive refractive power, the second lens group G2 being closer to an image than the first lens group G1 is. The first lens group G1 and the second lens group G2 have concave surfaces adjacent to and facing each other. An axial marginal light ray height is maximized at the lens surface of the objective 3 that is the closest to the image.

The first lens group G1 includes a biconvex lens L1 and a cemented lens CL1, wherein the object, the biconvex lens L1, and the cemented lens CL1 are arranged in this order. The cemented lens CL1, which is a first cemented lens of the objective 3, is a cemented doublet lens consisting of a biconvex lens L2 and a biconcave lens L3.

The second lens group G2 includes a cemented lens CL2, a cemented lens CL3, and a biconvex lens L8 having a concave surface facing the object, wherein the object, the cemented lens CL2, the cemented lens CL3, and the biconvex lens L8 are arranged in this order. The cemented lens CL2 is a cemented doublet lens consisting of a biconcave lens L4 and a biconvex lens L5. The cemented lens CL3, which is a second cemented lens of the objective 3, is a cemented doublet lens consisting of a biconcave lens L6 and a biconvex lens L7.

The following are various data of the objective 3.

F=45 mm, $F_{G1}$=22.06 mm, $F_{G2}$=37.92 mm, $NA_{ob}$=0.16, $|\beta|$=4, FN=13.25, WD=13.3561 mm, $F_{C1}$=−26.87 mm, $F_{C2}$=89.69 mm, $F_s$=27.96 mm, TL=49.2256 mm, $L_{gauss}$=3.2849 mm, $L_{max}$=13.47 mm, $|\Delta z_1|$=20.03 μm, $DOF_e$=10.66 μm, $Y_{reso}$=3.3125 mm The following are various data of the first cemented lens.

$\theta_{Ct}L_p$=0.82759, $\theta_{Ct}L_n$=0.83267, $\theta_{hg}L_p$=0.44171, $\theta_{hg}L_n$=0.45179, $vdL_p$=81.54, $vdL_n$=55.53

The following are various data of the second cemented lens.

$\theta_{Ct}L_p$=0.84233, $\theta_{Ct}L_n$=0.86854, $\theta_{hg}L_p$=0.43844, $\theta_{hg}L_n$=0.42541, $vdL_p$=94.66, $vdL_n$=71.8

The following are lens data of the objective 3.

| s | r | d | ne | nh | vd |
|---|---|---|---|---|---|
| 1 | INF | 0.17 | 1.52626 | 1.54042 | 54.41 |
| 2 | INF | 13.3561 | | | |
| 3 | 49.7449 | 2.4515 | 1.51825 | 1.52977 | 64.14 |
| 4 | −14.9766 | 1 | | | |
| 5 | 19.2275 | 13.47 | 1.49846 | 1.5072 | 81.54 |
| 6 | −7.9967 | 1.261 | 1.69979 | 1.71801 | 55.53 |
| 7 | 12.166 | 3.2849 | | | |
| 8 | −5.9627 | 2.4838 | 1.77621 | 1.79917 | 49.6 |
| 9 | 525.6645 | 2.5754 | 1.43986 | 1.44647 | 94.66 |
| 10 | −8.7004 | 0.2 | | | |
| 11 | −26.1604 | 1 | 1.48769 | 1.49719 | 71.8 |
| 12 | 18.625 | 2.7047 | 1.43986 | 1.44647 | 94.66 |
| 13 | −14.2892 | 2.7071 | | | |
| 14 | 298.0967 | 2.561 | 1.49846 | 1.5072 | 81.54 |
| 15 | −14.5782 | | | | |

As indicated in the following, the objective 3 satisfies conditional expressions (1)-(4-1) and (5)-(7) but does not satisfy conditional expression (4-2). Note that conditional expression (3) is satisfied by the first cemented lens.

$F_s/F_{C2}=0.312$ (1)

First Cemented Lens $(\theta_{C t}L_p-\theta_{C t}L_n)/(vdL_p-vdL_n)=-0.00020$

Second Cemented Lens $(\theta_{C t}L_p-\theta_{C t}L_n)/(vdL_p-vdL_n)=-0.00115$ (2)

First Cemented Lens $(\theta_{hg}L_p-\theta_{hg}L_n)/(vdL_p-vdL_n)=-0.00039$

Second Cemented Lens $(\theta_{hg}L_p-\theta_{hg}L_n)/(vdL_p-vdL_n)=0.00057$ (3)

$TL/F_{C1}=-1.83$ (4-1)

$TL/F_{C2}=0.55$ (4-2)

$(L_{gauss}\times TL)/(L_{max}^2)=0.89$ (5)

$|\Delta z_1|/DOF_e=1.879$ (6)

$Y_{reso}\times|\beta|=13.25$ mm (7)

Figure 7:
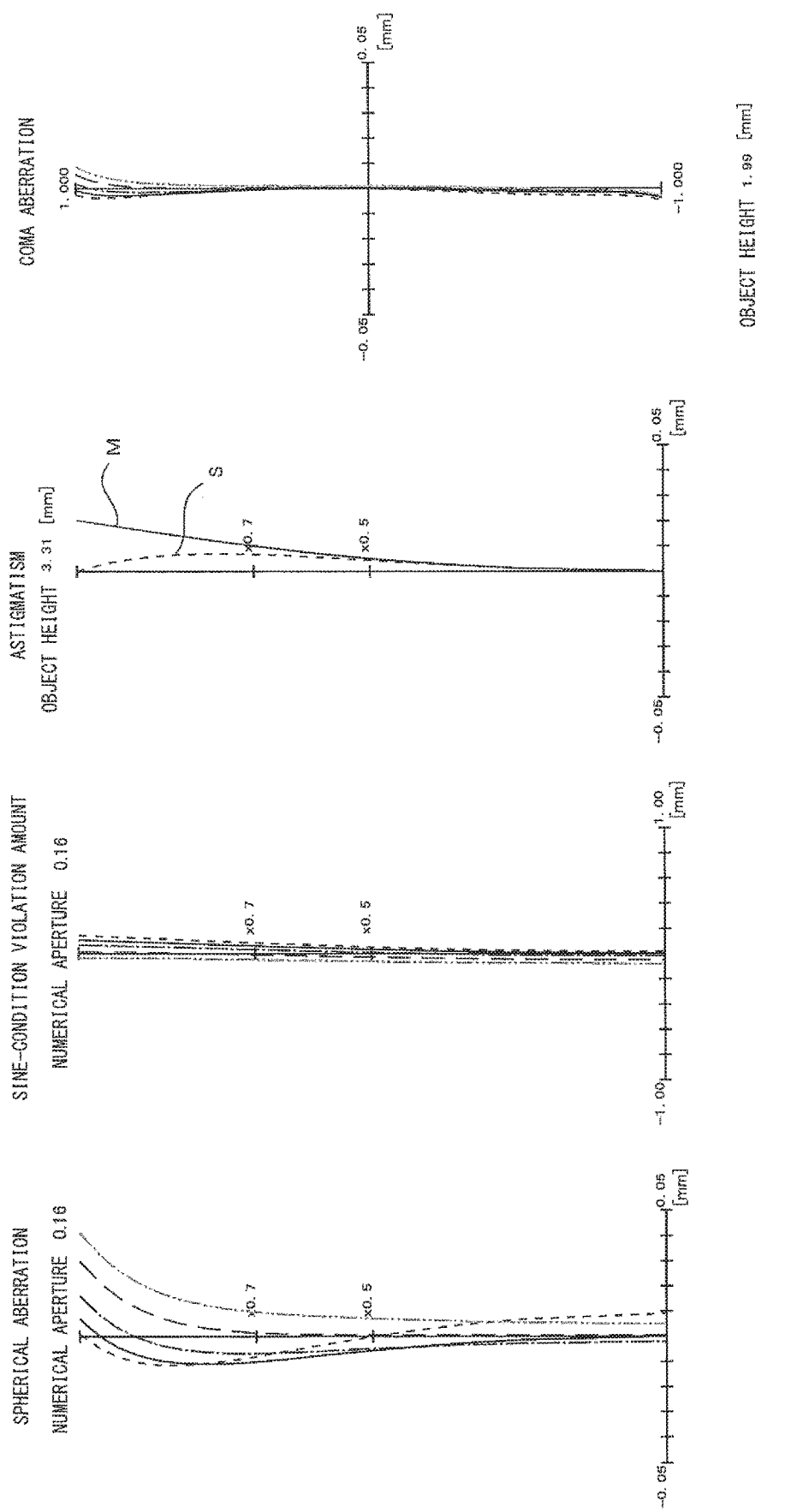

FIGS. 7A-7D are each an aberration diagram for the objective 3 depicted in FIG. 6. FIGS. 7A-7D indicate aberrations that occur on an object plane when an infinitely distant light flux is incident from an image side. FIG. 7A is a spherical aberration diagram. FIG. 7B illustrates a sine-condition violation amount. FIG. 7C is an astigmatism diagram. FIG. 7D is a coma aberration diagram for a position with an object height ratio of 0.6 (object height 1.99 mm). In the present embodiment, as depicted in FIGS. 7A-7D, aberrations are corrected for a wide field of view in a preferable manner.

Fourth Embodiment

Figure 8:
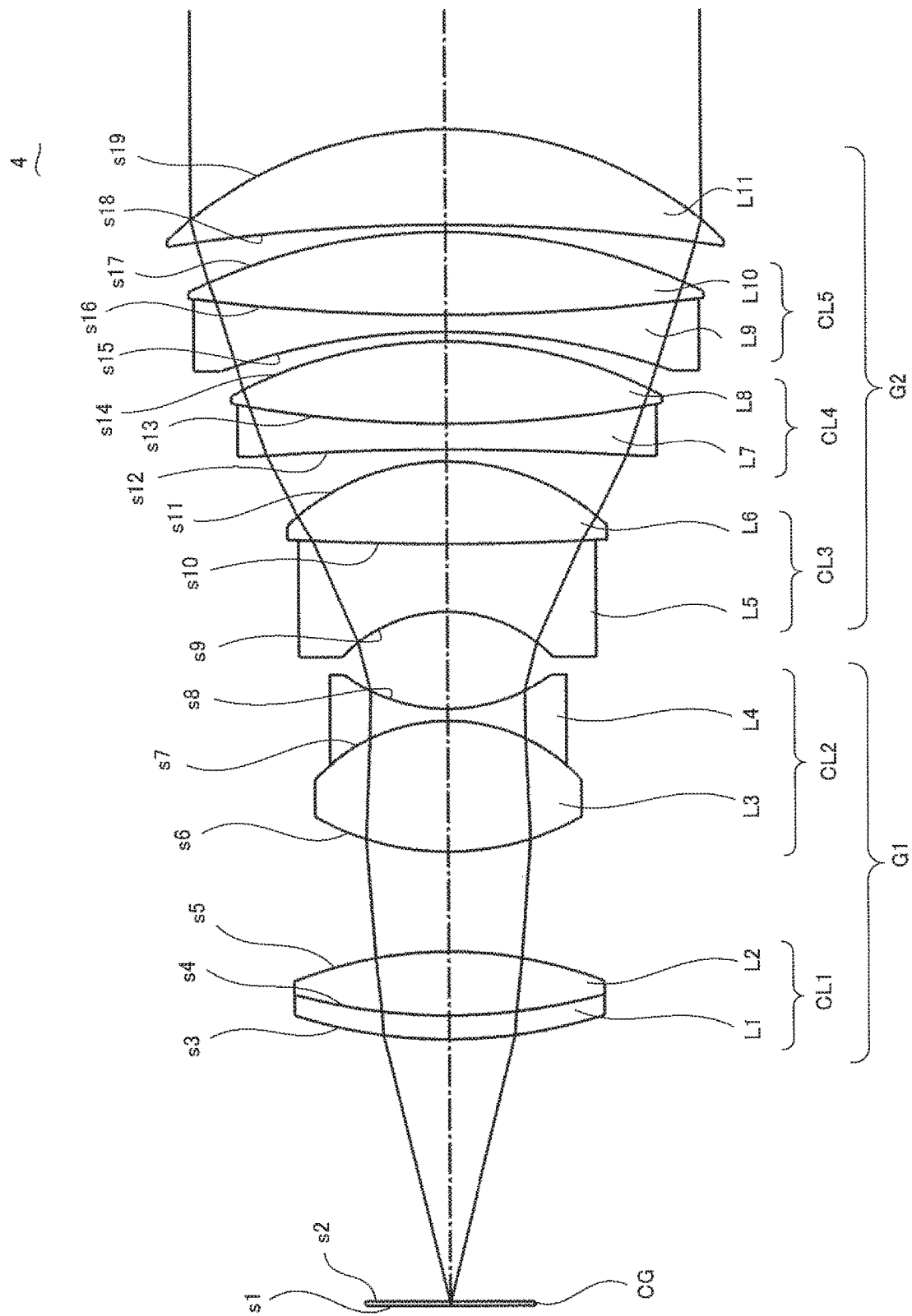
FIG. 8 is a cross-sectional view of an objective 4 in accordance with a fourth embodiment of the invention.

FIG. 8 is a cross-sectional view of an objective 4 in accordance with the present embodiment. The objective 4 is a dry microscope objective that includes a first lens group G1 having a positive refractive power and a second lens group G2 having a positive refractive power, the second lens group G2 being closer to an image than the first lens group G1 is. The first lens group G1 and the second lens group G2 have concave surfaces adjacent to and facing each other. An axial marginal light ray height is maximized at the lens surface of the objective 4 that is the closest to the image.

The first lens group G1 includes a cemented lens CL1 and a cemented lens CL2, wherein the object, the cemented lens CL1, and the cemented lens CL2 are arranged in this order. The cemented lens CL1 is a cemented doublet lens consisting of a meniscus lens L1 having a concave surface facing the image and a biconvex lens L2. The cemented lens CL2, which is a first cemented lens of the objective 4, is a cemented doublet lens consisting of a biconvex lens L3 and a biconcave lens L4.

The second lens group G2 includes a cemented lens CL3, a cemented lens CL4, a cemented lens CL5, and a meniscus lens L11 having a concave surface facing an object, wherein the object, the cemented lens CL3, the cemented lens CL4, the cemented lens CL5, and the meniscus lens L11 are arranged in this order. The cemented lens CL3 is a cemented doublet lens consisting of a biconcave lens L5 and a biconvex lens L6. The cemented lens CL4 is a cemented doublet lens consisting of a biconcave lens L7 and a biconvex lens L8. The cemented lens CL5, which is a second cemented lens of the objective 4, is a cemented doublet lens consisting of a biconcave lens L9 and a biconvex lens L10.

The following are various data of the objective 4.

F=45 mm, $F_{G1}$=22.30 mm, $F_{G2}$=50.40 mm, $NA_{ob}$=0.24, $|\beta|$=4, FN=13.25, WD=10.9640 mm, $F_{C1}$=−33.29 mm, $F_{C2}$=−2356.62 mm, $F_s$=49.19 mm, TL=49.1886 mm, $L_{gauss}$=4.075 mm, $L_{max}$=5.4593 mm, $|\Delta z_1|$=3.58 µm, $DOF_e$=4.74 µm, $Y_{reso}$=3.0475 mm The following are various data of the first cemented lens.
$\theta_{Ct}L_p$=0.84233, $\theta_{Ct}L_n$=0.86725, $\theta_{hg}L_p$=0.43844, $\theta_{hg}L_n$=0.44169, $vdL_p$=94.66, $vdL_n$=64.14

The following are various data of the second cemented lens.
$\theta_{Ct}L_p$=0.84233, $\theta_{Ct}L_n$=0.86725, $\theta_{hg}L_p$=0.43844, $\theta_{hg}L_n$=0.44169, $vdL_p$=94.66, $vdL_n$=64.14

The following are lens data of the objective 4.

| Objective 4 | | | | | |
|---|---|---|---|---|---|
| s | r | d | ne | nh | vd |
| 1 | INF | 0.17 | 1.52626 | 1.54042 | 54.41 |
| 2 | INF | 10.964 | | | |
| 3 | 21.7946 | 1 | 1.88815 | 1.92092 | 40.76 |
| 4 | 24.9359 | 2.6598 | 1.51825 | 1.52977 | 64.14 |
| 5 | −17.9676 | 4.1897 | | | |
| 6 | 11.5699 | 5.4593 | 1.43986 | 1.44647 | 94.66 |
| 7 | −7.6703 | 0.5 | 1.51825 | 1.52977 | 64.14 |
| 8 | 7.3946 | 4.0752 | | | |
| 9 | −6.2208 | 2.8398 | 1.75844 | 1.77954 | 52.32 |
| 10 | 133.0254 | 3.4328 | 1.43986 | 1.44647 | 94.66 |
| 11 | −9.8529 | 0.5 | | | |
| 12 | −114.7877 | 1.0902 | 1.48915 | 1.49898 | 70.23 |
| 13 | 48.9812 | 3.4385 | 1.43986 | 1.44647 | 94.66 |
| 14 | −19.3353 | 0.4 | | | |
| 15 | −28.6539 | 0.7 | 1.51825 | 1.52977 | 64.14 |
| 16 | 85.3746 | 3.4662 | 1.43986 | 1.44647 | 94.66 |
| 17 | −24.9437 | 0.3 | | | |
| 18 | −76.6386 | 4.0031 | 1.49846 | 1.5072 | 81.54 |
| 19 | −17.2175 | | | | |

As indicated in the following, the objective 4 satisfies conditional expressions (1)-(3) and (4-2), (6), and (7), but does not satisfy conditional expressions (4-2) and (5). Note that conditional expression (3) is satisfied by the first cemented lens.

$F_s/F_{C2}=-0.020$ (1)

First Cemented Lens $(\theta_{Ct}L_p-\theta_{Ct}L_n)/(vdL_p-vdL_n)=-0.00082$

Second Cemented Lens $(\theta_{Ct}L_p-\theta_{Ct}L_n)/(vdL_p-vdL_n)=-0.00082$ (2)

First Cemented Lens $(\theta_{hg}L_p-\theta_{hg}L_n)/(vdL_p-vdL_n)=-0.00011$

Second Cemented Lens $(\theta_{hg}L_p-\theta_{hg}L_n)/(vdL_p-vdL_n)=-0.00011$ (3)

$TL/F_{C1}=-1.48$ (4-1)

$TL/F_{C2}=-0.02$ (4-2)

$$(L_{gauss} \times TL)/(L_{max}^2) = 6.73 \tag{5}$$

$$|\Delta z_1|/DOF_e = 0.755 \tag{6}$$

$$Y_{reso} \times |\beta| = 12.19 \text{ mm} \tag{7}$$

FIGS. 9A-9D are each an aberration diagram for the objective 4 depicted in FIG. 8 and indicate aberrations that occur on an object plane when an infinitely distant light flux is incident from an image side. FIG. 9A is a spherical aberration diagram. FIG. 9B illustrates a sine-condition violation amount. FIG. 9C is an astigmatism diagram. FIG. 9D is a coma aberration diagram for a position with an object height ratio of 0.6 (object height 1.99 mm). In the present embodiment, as depicted in FIGS. 9A-9D, aberrations are corrected for a wide field of view in a preferable manner.

What is claimed is:

1. A microscope objective comprising:
a first lens group that has a positive refractive power and includes a first cemented lens; and
a second lens group, the first lens group and the second lens group having concave surfaces adjacent to and facing each other,
wherein:
an object, the first lens group, and the second lens group are arranged in this order,
the second lens group includes:
at least one lens component that has a negative refractive power overall,
a second cemented lens, and
a single lens that has a positive refractive power,
the object, the at least one lens component, the second cemented lens, and the single lens are arranged in this order,
an axial marginal light ray height is maximized at a lens surface of the microscope objective that is closest to an image, and
the microscope objective satisfies the following conditional expression:

$$-0.38 \le F_s/F_{C2} \le 0.38 \tag{1}$$

where $F_{C2}$ indicates a focal length of the second cemented lens for an e line, and $F_s$ indicates a focal length of the single lens for the e line.

2. The microscope objective of claim 1, wherein:
the first cemented lens and the second cemented lens each include a positive lens and a negative lens, and
the first cemented lens and the second cemented lens each satisfy the following conditional expression:

$$-0.016 \le (\theta_{Ct}L_p - \theta_{Ct}L_n)/(vdL_p - vdL_n) < 0 \tag{2}$$

where $\theta_{Ct}L_p$ indicates a partial dispersion ratio between a C line and a t line that is specific to the positive lens, $\theta_{Ct}L_n$ indicates a partial dispersion ratio between the C line and the t line that is specific to the negative lens, $vdL_p$ indicates an Abbe number of the positive lens, and $vdL_n$ indicates an Abbe number of the negative lens.

3. The microscope objective of claim 2, wherein:
at least one of the first cemented lens and the second cemented lens satisfies the following conditional expression:

$$-0.001 \le (\theta_{hg}L_p - \theta_{hg}L_n)/(vdL_p - vdL_n) < 0 \tag{3}$$

where $\theta_{hg}L_p$ indicates a partial dispersion ratio between an h line and a g line that is specific to the positive lens, and $\theta_{hg}L_n$ indicates a partial dispersion ratio between the h line and the g line that is specific to the negative lens.

4. The microscope objective of claim 1, wherein the microscope objective satisfies the following conditional expressions:

$$-1.25 \le TL/F_{C1} \le 1.25 \tag{4-1}$$

$$-1.25 \le TL/F_{C2} \le 1.25 \tag{4-2}$$

where $F_{C1}$ indicates a focal length of the first cemented lens for the e line, and TL indicates a distance on an optical axis between an object plane and the lens surface of the microscope objective that is the closest to the image.

5. The microscope objective of claim 2, wherein the microscope objective satisfies the following conditional expressions:

$$-1.25 \le TL/F_{C1} \le 1.25 \tag{4-1}$$

$$-1.25 \le TL/F_{C2} \le 1.25 \tag{4-2}$$

where $F_{C1}$ indicates a focal length of the first cemented lens for the e line, and TL indicates a distance on an optical axis between an object plane and the lens surface of the microscope objective that is the closest to the image.

6. The microscope objective of claim 3, wherein the microscope objective satisfies the following conditional expressions:

$$-1.25 \le TL/F_{C1} \le 1.25 \tag{4-1}$$

$$-1.25 \le TL/F_{C2} \le 1.25 \tag{4-2}$$

where $F_{C1}$ indicates a focal length of the first cemented lens for the e line, and TL indicates a distance on an optical axis between an object plane and the lens surface of the microscope objective that is the closest to the image.

7. The microscope objective of claim 1, wherein:
the first lens group includes two or more lenses, and
the microscope objective satisfies the following conditional expression:

$$0 < (L_{gauss} \times TL)/(L_{max}^2) \le 2.4 \tag{5}$$

where $L_{gauss}$ indicates a distance on an optical axis between a lens surface of the first lens group that is closest to the image in the first lens group and a lens surface of the second lens group that is closest to the object in the second lens group, TL indicates a distance on an optical axis between an object plane and the lens surface of the microscope objective that is the closest to the image, and $L_{max}$ indicates a longest surface interval in the first lens group.

8. The microscope objective of claim 1, wherein the microscope objective satisfies the following conditional expression:

$$0 \le |\Delta z_1|/DOF_e \le 2 \tag{6}$$

where $\Delta z_1$ indicates a difference between an axial position at which an RMS wave aberration in an h line is minimized and an axial position at which an RMS wave aberration in the e line is minimized, and $DOF_e$ indicates a depth of focus for the e line.

9. The microscope objective of claim 1, wherein the microscope objective satisfies the following conditional expression:

$$10 \text{ mm} \le Y_{reso} \times |\beta| \le FN \text{ mm} \tag{7}$$

where $Y_{reso}$ indicates a maximum object height within a region on a plane orthogonal to the optical axis that crosses an axial position at which an RMS wave aberration in the e line is minimized, wherein the region is such that the RMS wave aberration in the e line divided by a wavelength of the e line is 0.2 or lower, β indicates a magnification of the microscope objective, and FN indicates a maximum image height of the microscope objective and is ½ of a field of view number.

10. The microscope objective of claim 1, wherein a lens component of the microscope objective that is closest to the object is a cemented lens.

11. A microscope objective comprising:
two or more cemented lenses each including a positive lens and a negative lens,
wherein:
an axial marginal light ray height is maximized at a lens surface of the microscope objective that is closest to an image,
the two or more cemented lenses each satisfy the following conditional expression:

$$-0.016 \leq (\theta_{Ct}L_p - \theta_{Ct}L_n)/(vdL_p - vdL_n) < 0 \qquad (2), \text{ and}$$

at least one of the two or more cemented lenses satisfies the following conditional expression:

$$-0.001 \leq (\theta_{hg}L_p - \theta_{hg}L_n)/(vdL_p - vdL_n) < 0 \qquad (3)$$

where $\theta ctL_p$ indicates a partial dispersion ratio between a C line and a t line that is specific to the positive lens, $\theta_{Ct}L_n$ indicates a partial dispersion ratio between the C line and the t line that is specific to the negative lens, $vdL_p$ indicates an Abbe number of the positive lens, $vdL_n$ indicates an Abbe number of the negative lens, $\theta_{hg}L_p$ indicates a partial dispersion ratio between an h line and a g line that is specific to the positive lens, and $\theta_{hg}L_n$ indicates a partial dispersion ratio between the h line and the g line that is specific to the negative lens.

12. A microscope objective comprising:
two or more cemented lenses each including a positive lens and a negative lens;
a first lens group that has a positive refractive power and includes a first cemented lens; and
a second lens group, the first lens group and the second lens group having concave surfaces adjacent to and facing each other,
wherein:
the object, the first lens group, and the second lens group are arranged in this order,
the second lens group includes:
at least one lens component that has a negative refractive power overall,
a second cemented lens, and
a single lens that has a positive refractive power,
the object, the at least one lens component, the second cemented lens, and the single lens are arranged in this order,
the two or more cemented lenses includes the first cemented lens and the second cemented lens,
an axial marginal light ray height is maximized at a lens surface of the microscope objective that is closest to an image,
the microscope objective satisfies the following conditional expression:

$$-0.38 \leq F_s/F_{C2} \leq 0.38 \qquad (1), \text{ and}$$

the two or more cemented lenses each satisfy the following conditional expression:

$$-0.016 \leq (\theta_{Ct}\theta_{Ct}L_n)/(vdL_p - vdL_n) < 0 \qquad (2)$$

where $F_{C2}$ indicates a focal length of the second cemented lens for an e line, $F_s$ indicates a focal length of the single lens for the e line, $\theta_{Ct}L_p$ indicates a partial dispersion ratio between a C line and a t line that is specific to the positive lens, $\theta_{Ct}L_n$ indicates a partial dispersion ratio between the C line and the t line that is specific to the negative lens, $vdL_p$ indicates an Abbe number of the positive lens, and $vdL_n$ indicates an Abbe number of the negative lens.

13. The microscope objective of claim 12, wherein:
the first lens group includes two or more lenses, and
the microscope objective satisfies the following conditional expression:

$$0 < (L_{gauss} \times TL)/(L_{max}^2) \leq 2.4 \qquad (5)$$

where $L_{gauss}$ indicates a distance on an optical axis between a lens surface of the first lens group that is closest to the image in the first lens group and a lens surface of the second lens group that is closest to the object in the second lens group, TL indicates a distance on the optical axis between an object plane and the lens surface of the microscope objective that is closest to the image, and $L_{max}$ indicates a longest surface interval in the first lens group.

14. A microscope objective comprising:
two or more cemented lenses each including a positive lens and a negative lens,
wherein:
an axial marginal light ray height is maximized at a lens surface of the microscope objective that is closest to an image,
the two or more cemented lenses each satisfy the following conditional expression:

$$-0.016 \leq (\theta_{Ct}L_p - \theta\theta_{Ct}L_n)/(vdL_p - vdL_n) < 0 \qquad (2), \text{ and}$$

the microscope objective satisfies the following conditional expression:

$$-1.25 \leq TL/F_C \leq 1.25 \qquad (4)$$

where $\theta_{Ct}L_p$ indicates a partial dispersion ratio between a C line and a t line that is specific to the positive lens, $\theta_{Ct}L_n$ indicates a partial dispersion ratio between the C line and the t line that is specific to the negative lens, $vdL_p$ indicates an Abbe number of the positive lens, $vdL_n$ indicates an Abbe number of the negative lens, $F_C$ indicates a focal length of the two or more cemented lenses for a e line, and TL indicates a distance on an optical axis between an object plane and a lens surface of the microscope objective that is closest to the image.

15. A microscope objective comprising:
a first lens group; and
a second lens group, the first lens group and the second lens group having concave surfaces adjacent to and facing each other,
wherein:
an object, the first lens group, and the second lens group are arranged in this order,
the first lens group includes two or more lenses,
an axial marginal light ray height is maximized at a lens surface of the microscope objective that is closest to an image, and
the microscope objective satisfies the following conditional expression:

$$0.8 \leq (L_{gauss} \times TL)/(L_{max}^2) \leq 2.1 \qquad (5\text{-}1)$$

where $L_{gauss}$ indicates a distance on an optical axis between a lens surface of the first lens group that is closest to the image in the first lens group and a lens surface of the second lens group that is closest to the object in the second lens group, TL indicates a distance on the optical axis between an object plane and the lens surface of the microscope objective that is closest to the image, and $L_{max}$ indicates a longest surface interval in the first lens group.

16. The microscope objective of claim 15, wherein:
the first lens group includes a first cemented lens,
the second lens group includes:
  at least one lens component that has a negative refractive power overall,
  a second cemented lens, and
  a single lens that has a positive refractive power,
the object, the at least one lens component, the second cemented lens, and the single lens are arranged in this order, and
the microscope objective satisfies the following conditional expression:

$$-0.38 \leq F_s/F_{C2} \leq 0.38 \qquad (1)$$

where $F_{C2}$ indicates a focal length of the second cemented lens for an e line, and $F_s$ indicates a focal length of the single lens for the e line.

17. The microscope objective of claim 16, wherein:
the first cemented lens and the second cemented lens each includes a positive lens and a negative lens, and the first cemented lens and the second cemented lens each satisfy the following conditional expression:

$$-0.016 \leq (\theta_{Ct}L_p - \theta_{Ct}L_n)/(vdL_p - vdL_n) < 0 \qquad (2)$$

where $\theta_{Ct}L_p$ indicates a partial dispersion ratio between a C line and a t line that is specific to the positive lens, $\theta_{Ct}L_n$ indicates a partial dispersion ratio between the C line and the t line that is specific to the negative lens, $vdL_p$ indicates an Abbe number of the positive lens, and $vdL_n$ indicates an Abbe number of the negative lens.

18. The microscope objective of claim 17, wherein at least one of the first cemented lens and the second cemented lens satisfies the following conditional expression:

$$-0.001 \leq (\theta_{hg}L_p - \theta_{hg}L_n)/(vdL_p - vdL_n) < 0 \qquad (3)$$

where $\theta_{hg}L_p$ indicates a partial dispersion ratio between an h line and a g line that is specific to the positive lens, and $\theta_{hg}L_n$ indicates a partial dispersion ratio between the h line and the g line that is specific to the negative lens.

19. The microscope objective of claim 16, wherein the microscope objective satisfies the following conditional expressions:

$$-1.25 \leq TL/F_{C1} \leq 1.25 \qquad (4\text{-}1)$$

$$-1.25 \leq TL/F_{C2} \leq 0.25 \qquad (4\text{-}2)$$

where $F_{C1}$ indicates a focal length of the first cemented lens for the e line.

* * * * *